United States Patent
Ore

(10) Patent No.: US 7,924,788 B2
(45) Date of Patent: Apr. 12, 2011

(54) ACCESS AREAS IN A MOBILE SYSTEM

(75) Inventor: Ivan Ore, Helsinki (FI)

(73) Assignee: Nokia Corporation, Espoo (FI)

( * ) Notice: Subject to any disclaimer, the term of this patent is extended or adjusted under 35 U.S.C. 154(b) by 1230 days.

(21) Appl. No.: 11/520,654

(22) Filed: Sep. 14, 2006

(65) Prior Publication Data

US 2008/0070506 A1    Mar. 20, 2008

(51) Int. Cl.
*H04W 4/00* (2009.01)
*H04W 36/00* (2009.01)

(52) U.S. Cl. .................................. 370/331; 455/443
(58) Field of Classification Search .................. 370/331; 455/436, 443

See application file for complete search history.

(56) References Cited

U.S. PATENT DOCUMENTS

| | | | | |
|---|---|---|---|---|
| 2004/0203882 | A1* | 10/2004 | Laiho et al. | 455/456.1 |
| 2005/0048974 | A1 | 3/2005 | Kim et al. | |
| 2006/0014548 | A1* | 1/2006 | Bolin et al. | 455/456.1 |
| 2006/0121906 | A1* | 6/2006 | Stephens et al. | 455/446 |
| 2006/0121935 | A1* | 6/2006 | Dalsgaard et al. | 455/552.1 |
| 2006/0293059 | A1* | 12/2006 | Hornsey | 455/447 |
| 2009/0017819 | A1* | 1/2009 | Fox et al. | 455/435.1 |

FOREIGN PATENT DOCUMENTS

| | | |
|---|---|---|
| GB | 2 331 892 A9 | 6/1999 |
| WO | WO 9706648 | 2/1997 |
| WO | WO 03/005759 | 1/2003 |
| WO | WO 03005759 A1 | 1/2003 |

OTHER PUBLICATIONS

Riccardo Guerzoni, et al., "Automatic Neighbor Cell List Optimization for UTRA FDD Networks: Theoretical Approach and Experimental Validation", Sep. 2005, pp. 1-5.

3GPP TS 25.133 V4.1.0, "3$^{rd}$ Generation Partnership Project; Technical Specification Group Radio Access Networks; Requirements for Support of Radio Resource Management (FDD) (Release 4)", Jun. 2001, pp. 1-115.

3GPP TS 25.331 V7.1.0, "Radio Resource Control protocol for the UE-UTRAN radio interface . . . " Jun. 2006, pp. 1-1244.

International Search Report, PCT/IB2007/002518 filed Aug. 29, 2007.

Communication pursuant to Article 94(3) EPC dated Jul. 28, 2009 issued in connection with corresponding European application No. 07804865.9-2412.

* cited by examiner

*Primary Examiner* — Ricky Ngo
*Assistant Examiner* — Paul Masur
(74) *Attorney, Agent, or Firm* — Mintz, Levin, Cohn, Ferris, Glovsky and Popeo, P.C.

(57) ABSTRACT

A method of managing access areas in a communication system is disclosed. In the method information regarding a detected access area is received from at least one mobile device, the detected access area being an access area that is not included in a set of available access areas. Potential of the detected access area is then predicted based on the information received from the at least one mobile device. A decision is then made, based on the predicted potential, if the detected access area can be included into the set of available access areas.

22 Claims, 5 Drawing Sheets

ACCESS AREAS IN A MOBILE SYSTEM

FIELD OF THE INVENTION

The invention relates to mobile access to a communication system, and more particularly to managing defined sets of access areas that are available for mobile device in an access area.

BACKGROUND OF THE INVENTION

A communication device is a device provided with appropriate communication and control capabilities for enabling use thereof for communication with others devices. The communication typically is provided with an interface for accessing a communication system which carries the communication to and from the communication device. A communications system is thus a facility which enables communication between two or more remote entities such as communication device, network entities and other nodes. The communication may comprise, for example, communication of voice, electronic mail (email), text messages, data, multimedia and so on. The communication device may comprise any device facilitating sending and/or receiving communication, for example an appropriate user equipment (mobile or fixed), a mobile station and so on.

An appropriate access system typically provides a user with an access to the communications system. An access system typically operates in accordance with a given standard or with a given set of specifications which set out what the various elements of the system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the networks is typically based on a predefined communication protocol.

An access to a communications network may be provided by a fixed or wireless communication interface. Communication systems providing wireless access typically enable at least some degree of mobility for the users thereof. That is, the user may roam within the service area of his home network from an access area to another access area. The users are also typically allowed to roam into other networks, thus enabling use of the communication device even when the user is not located within the service are of his/hers home network but is visiting another network.

An example of a communication network providing wireless access and mobility is a public land mobile network (PLMN), such as the second generation (2G) GSM (Global System for Mobile communications), the so called third generation (3G) GPRS (General Packet Radio Service), and/or the WCDMA (Wideband Code Division Multiple Access) or EDGE (Enhanced Data for GSM Evolution) and so forth. Other examples of wireless access technologies include various different wireless local area networks (WLANs), Wi-Fi networks and satellite based communication systems.

The public land mobile networks (PLMN) are commonly based on cellular technology. In cellular systems, a base transceiver station (BTS) or similar entity providing an access area services a mobile communication device via a wireless interface. The operation of the base station apparatus and other apparatus required for the operation of the access system can be controlled by one or several control entities. An access area such as a cell can only serve a limited geographical area and also a limited number of users, and therefore a mechanism known as a handover is developed enabling the mobile device to move from an access area to another.

A mobile communication device may be configured to be compatible with different access technologies and thus capable of communication via a plurality of different access systems. For example, a mobile device may be provided with multi-radio capabilities, thus enabling access to services via a plurality of different radio access networks and a handover there between.

As mentioned above, a communication system such as a cellular communication system comprises a plurality of access areas. Neighbouring access areas typically overlap to ensure continuous coverage instead of just being next to each other, as illustrated in FIG. 1. The network typically maintains for each access area a defined set of available other access areas. In certain standards, the set of available access areas is termed a neighbour cell list (NCL). The mobile device may be handed over from an access area to another access area assuming that the other access area is on the set of available access areas. These sets are typically communicated to the mobile devices so that they are aware of the available access areas. In a normal mode the mobile device only cares about access areas that were included in the set of available areas. If it is detected that a detected access is not included in the set of available access areas, the mobile device typically takes no action. However, if a feature such as detected set reporting (DSR) or similar is activated, the mobile can monitor other access areas than those described in the set of access areas it received from the network.

The sets of access areas are an important management tool for the operators in providing continuous mobility and good quality service and therefore a lot of effort is put into maintaining a list of neighbour cells for each cell or similar sets. The sets of access areas are typically created at the time of building a network. The sets of access areas may be updated from time to time.

Identifying and adding missing neighbours to the sets is a particular aspect of the management. The term missing neighbour refers to a cell or another access area that is not defined in a set of available access area, for example a neighbour list but nevertheless provides good radio conditions within a particular access area. Managing a neighbour list for an access area thus includes identifying and adding potential missing neighbours that are not yet, for reason or another, defined in the neighbour list. When managing a neighbour list, a set of missing neighbours can be detected or found based on information such as coverage predictions, field measurements and so on. In the existing systems all identified missing neighbours are added to the neighbour list. The operator may then later on delete those neighbours from the list that do not perform especially well, and thus do not function as "good neighbours" for the particular access area.

The performance of the added neighbours, however, can only be evaluated later on, after the operator has gained some experience of this. Those missing neighbours that are considered as ones that do not contribute to an improvement on the performance can then be deleted from the neighbour list.

The automatic inclusion of all identified missing neighbours into the neighbour list may not be an optimal solution in certain occasions. For example, the size of the list may be such that not all of the identified missing neighbours will necessary fit into the neighbour list. Also, not all of the identified missing neighbours may actually be good neighbours, and thus this may result in unnecessarily adding neighbours into the neighbour list, which then need to be removed later on by the operators.

SUMMARY

In accordance with an embodiment there is provided a method of managing available access areas in a communication system In the method information regarding a detected access area is received from at least one mobile device, the detected access area being an access area that is not included in a set of available access areas. Potential of the detected access area is then determined based on the information received from the at least one mobile device and it is decided, based on the predicted potential, if the detected access area can be included into the set of available access areas.

Another embodiment provides an apparatus for managing access areas in a communication system. The apparatus comprises an interface configured to receive information that is related to a detected access area that is not included in a set of available access areas from at least one mobile device. The apparatus further comprises a processor configured to predict potential of the detected access area based on the information received from the at least one mobile device and to manage inclusion of the detected access area in the set of available access areas based on the predicted potential of the detected access area.

A further embodiment provides an access network controller configured to enable communication of information that is related to a detected access area that is not included in a set of available access areas from at least one mobile device. The access network controller is further configured to predict potential of the detected access area based on the information received from the at least one mobile device and to manage inclusion of the detected access area in the set of available access areas based on the predicted potential of the detected access area.

A yet further embodiment provides a tool for managing sets of access areas. The tool is configured to process information from at least one mobile device that is related to a detected access area that is not included in a set of available access areas and to predict potential of the detected access area based on the information received from the at least one mobile device. Inclusion of the detected access area in the set of available access areas can then be managed based on the predicted potential of the detected access area.

In accordance with a still further embodiment a communication system is provided. The communication system comprises a plurality of access areas, wherein mobile devices can be handed over from an access area to another access area included in a set of available access areas. The communication system further comprises an access network controller configured to enable communication of information that is related to a detected access area that is not included in the set of available access areas from at least one mobile device, to predict potential of the detected access area based on the information received from the at least one mobile device, and to manage inclusion of the detected access area in the set of available access areas based on the predicted potential of the detected access area.

A further embodiment provides a method of providing information for use in managing access areas in a communication system. The method comprises detecting in at least one mobile device an access area that is not included in a set of available access areas and performing measurements by the at least one mobile device regarding the detected access area. In the method information regarding the detected access area and the measurements is then transmitted to a network entity for use in predicting potential of the detected access area and for deciding if the detected access area can be included into the set of available access areas.

In a more specific embodiment a size of an overlap between an detected access area and an access area for which the set of available access areas is maintained is determined, where after the potential of the detected access area is predicted based on the size of the overlap.

The information received may comprise handover messages from a mobile device that is located in an area covered by the detected access area and an access area for which the set of available access areas is maintained. A size of an overlap between the detected access area and said other access area may then be determined based on information of the handover messages, and the potential of the detected access area may be predicted based on the size of the overlap. The information of the handover messages may comprise the number of handover reports.

The access areas may be ranked based on the predicted potential of the detected access area.

The prediction may be based on analysis of information received in handover reports and detected set reporting reports. Information of radio measurements from the at least one mobile device may also be analysed.

The embodiments provide a mechanism for management of neighbour lists in a communication system.

It shall be appreciated that these issues are not limited to any particular communication environment, but may occur in any appropriate communication system.

Various other aspects, exemplifying embodiments and advantages are described in the following detailed description and in the attached claims.

BRIEF DESCRIPTION OF THE DRAWINGS

The invention will now be described in further detail, by way of example only, with reference to the following examples and accompanying drawings, in which.

DETAILED DESCRIPTION OF EXEMPLIFYING EMBODIMENTS

In the following embodiments that employ an intelligent mechanism to filter any new entrant into a set of available but missing access areas are described. In the exemplifying embodiments neighbours that potentially satisfy a selection criterion are identified based on information received from a mobile device. The mechanism can be advantageously used for reducing the amount of potentially unnecessary additions of access areas into a list of available access areas that might otherwise be added to the list.

Figure 1:
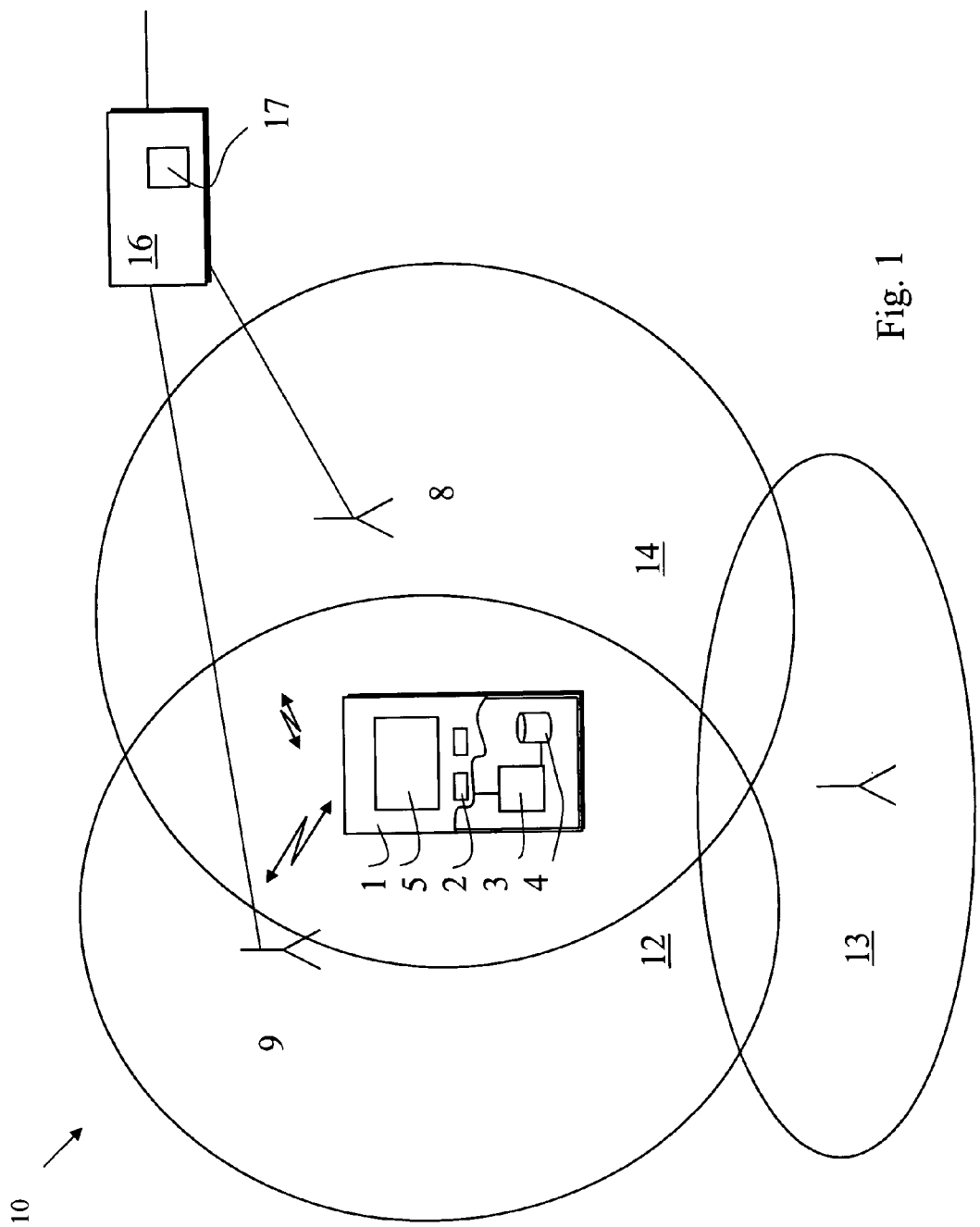
FIG. 1 shows an example of an access system in which the embodiments may be implemented.

Before explaining in detail some possible embodiments, a communication system providing mobility for the users thereof is briefly explained with reference to features of a cellular system shown in FIG. 1. A cellular communication system is typically arranged to serve a plurality of mobile communication devices 1, or user equipment via access entities known as cells 12, 13 and 14. Each of the cells is provided by means of at least one base station 8, 9. The mobile device 1 can access the communication system via a wireless interface between the mobile device and at least one of the base stations 8, 9. A base station is typically controlled by an appropriate controller 16, for example a base station controller and/or a radio access network controller. It is understood that although FIG. 1 shows three neighbouring cells 12 to 14, any number of cells may be provided.

A user may access the communication system by means of a mobile communication device such as a mobile station (MS), a personal computer, personal data assistant (PDA), portable computer, any combinations thereof or the like. A mobile communication device within a radio access network may communicate with a controller of the radio network via radio channels which are typically referred to as radio bearers. Each mobile device may have one or more radio channels open at any one time with the radio network controller. The mobile devices may be enabled for packet data communications via a communications system.

The mobile device 1 can be used for various tasks such as making and receiving phone calls, for receiving and sending data from and to a network and for experiencing, for example, multimedia or other content. The communication device is typically provided with a processor 3 and a memory 4 for accomplishing these tasks. The operation of the user equipment may be controlled by means of a suitable user interface such as key pad 2, voice commands, touch sensitive screen or pad, combinations thereof or the like. A display 5 is also typically provided. A mobile communication device may use various applications based on appropriate protocols, for example a plurality of wireless communications protocols and/or the mobile internet protocol (IP).

As mentioned above, the communication system 10 of FIG. 1 is configured to provide a plurality of neighbour cells. In such arrangement cells that cover at least partially same geographical area are typically provided, this being illustrated by the overlap between cells 12, 13 and 14. In other words, in certain areas the mobile device 1 may access the communication system via more than one cell. For example, mobile device 1 may access the system either via cell 12 or cell 14.

Furthermore, the mobile device 1 can be handed over from one cell to another. The communication system is configured to be able to dynamically command and process handovers. The control may be based on list of available access areas, for example based on a list of neighbour cells. If a neighbouring cell is included in such a list for a cell, the mobile device can be handed over thereto. If it does not appear on the list, the handover is not possible.

Typically the handover process is controlled by at least one controller or a set of interconnected controllers. A controller block 16 denotes the handover controller in the example of FIG. 1. It is understood that the handover controller may be provided by any appropriate controller entity for managing and/or initiating a handover in a mobile communication system. The controller is suitably interconnected with the access networks so as to appropriately control the handover.

Figure 2:
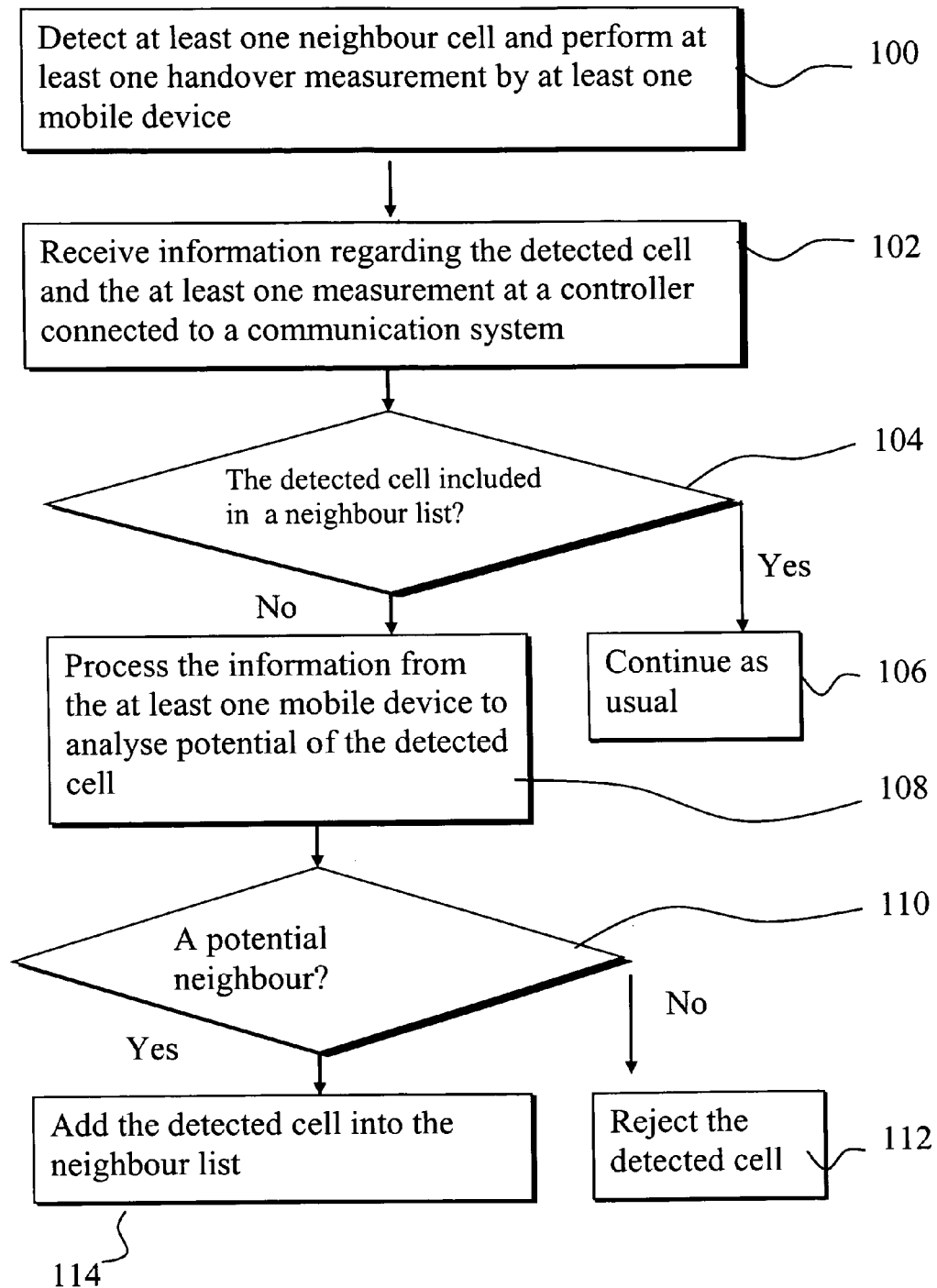
FIG. 2 is a flowchart illustrating an embodiment.

The flowchart of FIG. 2 illustrates an embodiment of managing a list of available access areas. At 100a mobile device detects existence of a cell and subsequently performs appropriate measurements. Information about the detected cell and the measurements is then communicated to a controller in the network at 102. The controller then determines if the detected cell is one that is not included in a list of available access areas at 104. If the cell is included in the list, an appropriate processing of the information ensues at 106. For example, the mobile device can be handed over to the detected cell.

If it is determined at 104 that the cell is not included in the list, the information is processed at 108 to predict the potential of the detected cell. The prediction is based on analysis of the information received from the mobile device. If it is determined at 110 that the detected non-listed cell should be included in the list, the cell is added in the list of available cells at 114. If a selection criterion is not satisfied, the cell is rejected at 112.

The updated neighbour list may then be communicated to mobile devices within the source cell. The mobile devices may then initiate handover to the detected, but previously missing cell, in normal manner.

Figure 3A:
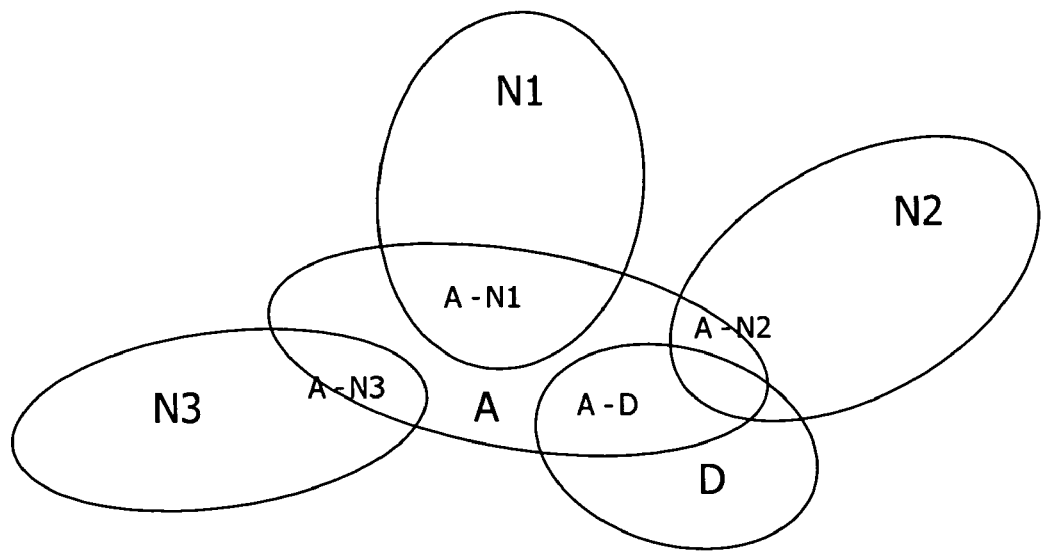
FIGS. 3A and 3B show coverage distribution including source, neighbours and the missing neighbour in two different scenarios.

In accordance with an embodiment the prediction of the suitability of a neighbour cell is based on the size of the overlapping areas between the neighbour cells. This is exemplified in FIG. 3A showing a source cell (A), three neighbours (N1, N2 and N3) and a detected cell D, i.e. a cell that is identified based on measurements by the mobile device as being a missing neighbour. The size of the overlapping areas is considered as an indication of how good and necessary the detected missing neighbour is. In the embodiments the size of the overlapping area with the detected missing neighbours, i.e. cell D, is determined. The prediction may then be based on the size of the overlapping area between the source cell A and the missing neighbour cell D.

A possibility is to compare the size of area A-D with the sizes of the overlaps of the listed cells. For example, a comparison of the areas of overlapping areas A-N1, A-N2 and A-N3 would indicate that N1 is the best of the existing neighbours, as it has the biggest overlapping area. N2 is then determined as being the second best neighbour and N3 is the least favourable neighbour of the existing listed neighbours. Nevertheless, in the situation of FIG. 3A, the overlapping area between cell A and missing neighbour cell D can be determined as being relatively large, and greater than area A-N2 or A-N3. If the rule for acceptance is that the detected cell has to have more potential than any of the existing cells, this criterion would be satisfied.

Figure 3B:
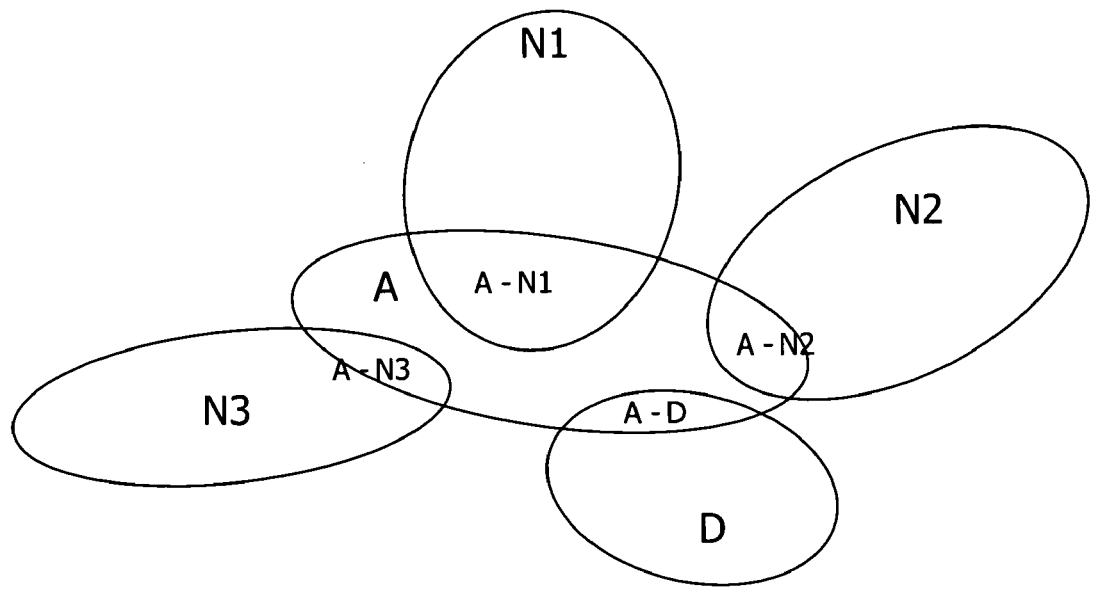

The detected missing neighbour D of FIG. 3B is clearly less potential than cell D shown in FIG. 3A. In FIG. 3B the overlap of cells A and D is less than the overlap the source cell A has with other neighbours, and would therefore not be selected based on the criteria mentioned above. However, the above was only an example, and the selection criteria may be selected relatively freely. For example, all cells exceeding a threshold for an absolute or relative size of the overlap may be selected. Thus it may be that the area A-D, and hence cell D, can be found acceptable. This is an implementation specific issue.

The following explains in greater detail examples for how to identify potentially good missing neighbours by predicting their neighbour performance. The embodiments may be applied to any cellular network where mobile devices can be allowed to measure and report cells that are not defined in a neighbour list or similar.

There are various ways how to measure or to otherwise determine the size of the overlapping area between two cells. One relatively straightforward solution is to determine the size based on number of handovers between the cells. This is based on the realisation that the size of the overlapping area A-Nx is directly proportional to the number of handover attempts from cell A to cell Nx.

However, by definition, a missing neighbour cannot be named in a neighbour list. Therefore there may not be handover attempts from cell A to cell D because D is not defined in the neighbour cell list of cell A. In an exemplifying prediction method this is overcome based on use of information from handover (HO) reports and detected set reports (DSR). This kind of reporting is possible, for example, in the Wideband Code Division Multiple Access (WCDMA) networks where the mechanism is known as a detected set reporting. It is noted that reporting of detected access areas that are not included in a set of access areas as received from the network is a feature of a number of other standards as well, and therefore any references in this specification to detected set reports (DSR) is to be understood to be a reference to an example only. The handover may or may not use macro diversity combining and the embodiments are applicable to hard or soft handover.

A detected set reporting (DSR) or similar reporting of identified potential cells may be used as a way to obtain measurement information regarding a detected cell, even when it is not included in the list. A feature of this kind of reporting is that it can be enabled even for cells that would not otherwise be reported by the mobile devices. The feature can be enabled in a network controller, for example in a radio network controller by the operator. The operator may activate the detected set reporting via an external unit or the network controller unit. The controller then sends appropriate messages to the mobile device(s) instructing it/them to report also cells that are not specified in the neighbour list. These instructions can be provided to the mobile devices at any time, for example during an initial call setup. It is noted that the specific details of how to enable the reporting are operator specific implementation issues.

When a detected set reporting mechanism is enabled, the mobile devices may start sending to the network measurement reports regarding a detected cell once the mobile device enters the area of the new cell, for example the overlapping area A-D of FIG. 3A. The greater the overlapping area the greater is the possible number of mobile devices in the area and the more reports are likely to be generated.

One way to assess the performance of a detected missing neighbour is to compare its performance against the performance of at least one existing i.e. listed neighbour. This may be provided by comparing the number of reports received for cell A of FIG. 3A and the identified missing neighbour A-D with the number of reports for cell A and the existing cells (A-Nx). If more reports are obtained for the identified missing cell than for the existing cells, that is a clear indication that the mobile device(s) has recognised cell D as a potential handover target.

However, the nature of the reporting may not be in all applications the same for cells that are already on the neighbour list and for neighbour cells that are not listed and thus not available for handover. For example, in a typical scenario only one measurement report (A,Nx) is all that is needed in order to hand a mobile device over from the cell A to a listed cell Nx. For a detected missing cell several reports for overlapping area A-D may, however, become available. This can be so, for example, since the network itself does nothing with these reports and there may be no mechanism to stop the mobile device from providing the reports once it has found a potential cell which it, however, cannot be handed over to.

Thus, there may be a greater number of reports from a detected potential missing cell than for the already listed neighbour cells. This situation can be addressed and the comparison of overlapping areas (A-Nx) and (A-D) can be made more accurate in such occasions by use of an appropriate weight factor. With the support of the appropriate weight factor it is then possible to assess the neighbour performance of the identified missing cell relative to the existing cells. This factor can be determined based on statistics information and/or trial and error.

Prediction of the neighbour performance of the missing neighbour can thus be provided without the need of adding the missing neighbour first into the neighbour list.

Certain embodiments also enable ranking of the access areas. For example, in the scenario of FIG. 3A, the neighbour cells may be listed in ranking order from high to low based on the size of the overlapping areas:

A-N1,
A-D,
A-N2,
A-N3.

It can bee seen from the list that the identified missing neighbour cell D is actually a more potential neighbour than what the already listed cells N2 and N3 are. The criteria for addition of the cell may simply be that the detected cell is added if it is better than any of the already listed cells, or better than at least two of the previously listed cells and so forth.

The measurement reports from detected cells sent by the mobile device can also include information of radio measurements. For example, the measurement report may include information regarding the energy levels measured by the mobile device, for example the energy of chip per noise ratio (EcNo), energy of bit per noise ration (EbNo), energy of symbol per noise (EsNo) and/or radio signal code receiver (RSCP). This measurement data can also be used in the ranking of the cells. The information may be used either independently or as an additional information to information of handover attempts.

Figure 4:
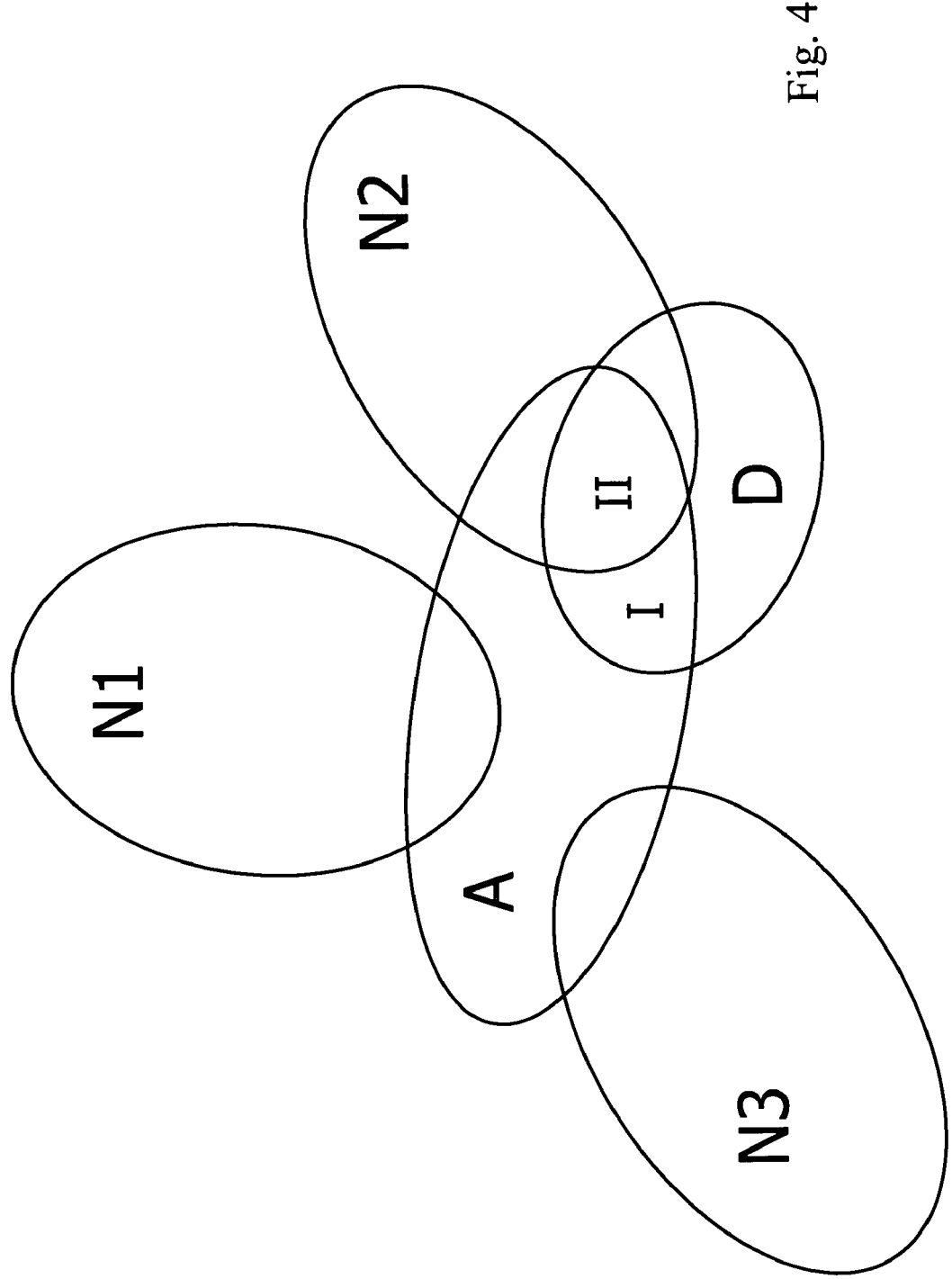
FIG. 4 shows overlapping areas between source and missing neighbour during a soft handover.

In networks supporting soft handover a situation may occur where a missing neighbour behaves both as a detected missing neighbour cell and also as a normal neighbour. This is because during a soft handover, the neighbour cell list delivered to the mobile device is a result of a combination of all neighbour cell lists from each cell in the active cell. This situation is illustrated in FIG. 4. It is assumed that cell D is defined in the neighbour list of cell N2 but not in the neighbour list of cell A. In area II, where cell A and cell N2 are in the active set of neighbours, the mobile device receives a combined neighbour list which includes cell D as a neighbour because cell D is defined in the neighbour list of cell N2. Thus, a handover from cell A to cell D in area II is possible, even when cell D is not defined in the neighbour cell list of cell A. In area I the situation is, however, different. A neighbour list for cell A does not include cell D as a neighbour so the detected cells are only reported but no other action may follow.

This complex situation of the relationship between cell A and cell D can be addressed in the prediction of the neighbouring performance in area A-D by splitting the performance analysis into two parts, i.e. to neighbouring performance in area II and neighbouring performance in area I. Neighbouring performance in area II is calculated as any other neighbouring A-Nx, i.e., based on the number of soft handovers. Neighbouring performance in area I is calculated as for scenarios in FIG. 3A, for example based on number of detected set reports and use of a weighting factor, if required.

Because the number of handovers or the number of detected reports may vary according to the data collection time, it may be advantageous in certain applications to normalise the results and for example to use a ratio rather than any actual figure in the comparisons. For example, by dividing the derived indicators over another indicator such as total soft handovers per cell it is possible to obtain time-independent values. Examples of this include:

number of detected reports/total_soft_handovers_per_cell, number of soft_handovers_A-Nx/total_soft_handovers_per_cell.

The set management tool may be provided as a part of an optimisation or management tool provided in a controller for an access network, for example a radio network controller (RNC). This option is illustrated in FIG. 1 showing a management tool module 17 of the controller 16.

Figure 5:
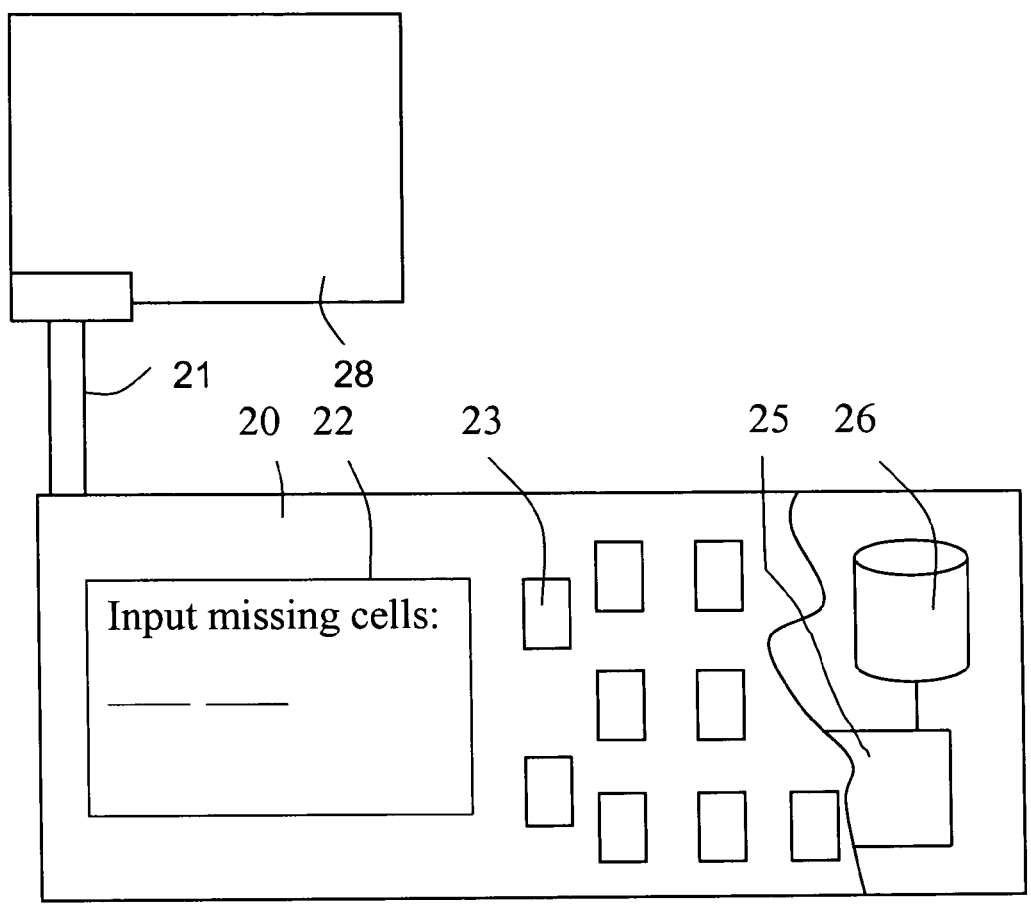
FIG. 5 shows a management tool unit.

The set management tool may also be provided as an external or standalone unit. The external unit may even be arranged to be connected to the communication system only when needed, e.g. subsequent to changes in access network. An external unit 20 that may be connected to an appropriate network entity 28 is illustrated in FIG. 5. The external unit is provided with appropriate communication interface, either wireless or wireless, to enable the connection 21. User interface such as a display 22 and keypad 23 are also preferably provided. The data processing functions are provided by a processing unit 25 that is operationally connected to the user and other interfaces and to a memory unit 26.

The optimisation process may be used continuously, enabling the network to adaptively and automatically adjust the neighbour sets in response to changes in the radio environment. This can be used to address, for example, changed line of sight or transmission power conditions in the cells. The adjustment process may also operate and be used by the operator on a need basis, for example periodically, after known changes in the access system or after service quality reports.

In accordance with a use scenario an operator of a network is provided with an optimisation tool. The optimisation tool may be provided as an integrated part of the communication system or as an external analysing tool shown in FIG. 5. The optimisation tool is provided with handover prediction results for missing neighbours. The operator may start the optimisation process by activating an "identify potential missing neighbour" function of the tool. The tool commands a controller connected to an access system, for example a radio network controller, to enable reporting of detected non-listed cells in a similar manner as in which mobile devices report measurements from cells defined in the neighbour list. At the end of the optimisation process the tool may propose a list of potential missing neighbours and also neighbour performance prediction results. Based on this information, the operator can choose which cells, if any, from the list are to be added into the neighbour list.

In accordance with another use scenario an operator obtain an optimisation tool that includes handover prediction results of missing neighbours. The operator has also information of extensive field trials and has identified a list of missing neighbours. The operator activates the optimisation tool and inputs details of the identified missing neighbours. The tool commands an access network controller to enable reporting of detected cells. At the end of the optimisation run the tool gives a depurated list including the best potential missing neighbours that can be added in the neighbour list. Based on this information, the operator can choose which cells, if any, from the initial list will be added into the neighbour list.

The herein described prediction embodiments may allow filtering of missing neighbours that would otherwise be added into the neighbour cell list. The management of the neighbour lists may be automated since instead of adding all detected missing cells in the lists only those missing neighbours with a good predicted handover levels or other good neighbouring characteristics are to be included in the neighbour list. Classification of the missing neighbours in order of goodness is also provided. This can be helpful if the number of neighbour cells already listed in the neighbour cell list is so high that only a few missing neighbours can be added into the list. In this case, only the top ranked missing neighbours are added into the neighbour cell list. The results of the prediction may be advantageously used to provide an idea how the proposed cells will be performing if added in the neighbour list. This can be used also in the network upgrade planning stage, since the operators may not be willing to make any modifications to the network unless there is some evidence that the changes are going to result improved operation.

It is noted that although the above refers to a reporting mechanism that is based on use of detected set reports (DSR), this is just an example of a possible underlying reporting mechanism that is currently supported in the WCDMA for the reporting of cells not included in a neighbour cell list. Therefore is shall be understood that any reference to the detected set reports in this document can be understood as a reference to any appropriate reporting mechanism, since similar reporting mechanisms exist in other network technologies under different names.

The required data processing functions may be provided by means of one or more data processors. Appropriately adapted computer program code product may be used for implementing the embodiments, when loaded to an appropriate network node or tool. The processor for running the software in, for example, a network node may be integrated with the existing processor of the network node. The program code means may, for example, perform the operation of monitoring and decision making, and of generation of messages and/or information elements required to determine the potential of an identified candidate cell. The program code product for providing the operation may be stored on and provided by means of a carrier medium such as a carrier disc, card or tape. A possibility is to download the program code product to the mobile device or any of the network entities via a data network.

It is noted that whilst embodiments of the present invention have been described in relation to communication devices such as mobile terminals, embodiments of the present invention are applicable to any other suitable type of devices suitable for communication via a communications network.

It is also noted that although certain embodiments are described herein by way of example, with reference to the exemplifying architectures of a communication system comprising certain mobile communication technologies, embodiments may be applied to any other suitable forms of communication systems and devices than those illustrated and described herein.

It is also noted herein that while the above describes exemplifying embodiments of the invention, there are several variations and modifications which may be made to the disclosed solution without departing from the scope of the present invention as defined in the appended claims.

The invention claimed is:
1. A method comprising:
receiving a handover message from at least one mobile device located in an area covered by the detected access area and an access area for which a set of available access areas is maintained, the detected access area being an access area that is not included in the set of available access areas;

determining, based on at least the handover message, a size of an overlap between the detected access area and the access area for which the set of available access areas is maintained;

predicting potential of the detected access area based on at least the handover message received from the at least one mobile device, wherein the predicted potential is determined based on the size of the overlap, wherein as the size increases, the predicted potential of the detected area increases a likelihood that the detected access area is added to the set of available access areas, wherein the predicting of the potential comprises weighting information included in the handover message, and wherein the information included in the handover message comprises a quantity of handover reports; and deciding, based on the predicted potential, whether to include the detected access area in the set of available access areas.

2. The method as claimed in claim 1, comprising ranking the access areas taking into account the predicted potential of the detected access area.

3. The method as claimed in claim 1, wherein predicting the potential comprises predicting the potential of a detected missing neighbor cell of a cellular system.

4. The method as claimed in claim 1, wherein the detected access area comprises a detected missing neighbor of a cellular system, and the deciding comprises deciding if the detected missing neighbor can be included into a list of neighbor cells maintained for a cell that overlaps with said detected missing neighbor.

5. The method as claimed in claim 4, comprising sending of the updated list of neighbor cells to mobile devices within said cell overlapping with the detected missing neighbor.

6. The method as claimed in claim 1, comprising enabling reporting of handover messages for access areas that are not included in the set of available access areas.

7. The method as claimed in claim 1, wherein the predicting of the potential comprises analyzing information received in handover reports and detected set reporting reports.

8. The method as claimed in claim 1, comprising receiving and analyzing information of radio measurements from the at least one mobile device.

9. The method as claimed in claim 1, wherein the predicting comprises predicting of the potential by separately analyzing the detected access area in a plurality of subareas, wherein the performance in a first subarea is analyzed based on a different analysis than the performance in a second subarea.

10. The method as claimed in claim 1, comprising: normalizing said information from the mobile device; and
predicting the potential of the detected access area based on the normalized information.

11. The method as claimed in claim 1, comprising continuously managing the set of available access areas based on the predictions.

12. The method as claimed in claim 1, comprising managing the set of available access areas only in response to a predefined event.

13. An apparatus comprising:
an interface configured to receive a handover message from at least one mobile device located in an area covered by the detected access area and an access area for which a set of available access areas is maintained, the detected access area being an access area that is not included in the set of available access areas; and a processor configured to
determine, based on at least the handover message, a size of an overlap between the detected access area and the access area for which the set of available access areas is maintained, predict potential of the detected access area based on at least the handover message received from the at least one mobile device, wherein the predicted potential is determined based on the size of the overlap, wherein as the size increases, the predicted potential of the detected area increases a likelihood that the detected access area is added to the set of available access areas, wherein the predicting of the potential comprises weighting information included in the handover message, and wherein the information included in the handover message comprises a quantity of handover reports, and decide, based on the predicted potential, whether to include the detected access area in the set of available access areas.

14. The apparatus as claimed in claim 13, wherein the processor is configured to rank available access areas taking into account the predicted potential of the detected access area.

15. The apparatus as claimed in claim 13, wherein the detected access area comprises a detected missing neighbor cell of a cellular system.

16. The apparatus as claimed in claim 13, wherein the detected access area comprises a detected missing neighbor of a cellular system, and the processor is configured to decide if the detected missing neighbor can be included into a list of neighbor cells maintained for a cell that overlaps with said detected missing neighbour.

17. The apparatus as claimed in claim 13, wherein the apparatus is configured to enable reporting of handover messages by mobile devices for access areas that are not included in the set of available access areas.

18. The apparatus as claimed in claim 13, configured to analyze information received in handover reports and detected set reporting reports.

19. The apparatus as claimed in claim 13, wherein the processor is configured to predict the potential of a detected access area by analyzing the detected access area in a plurality of subareas, wherein the performance in a first subarea is analyzed based on a different analysis than the performance in a second subarea.

20. The apparatus as claimed in claim 13, configured to continuously manage the set of available access areas based on the predictions.

21. The apparatus as claimed in claim 13 being provided in association with one of an access network controller of a communication system and an access network management tool.

22. A non-transitory computer program embodied on a non-transitory computer-readable medium, the computer program configured to provide a method comprising:
receiving a handover message from at least one mobile device located in an area covered by the detected access area and an access area for which a set of available access areas is maintained, the detected access area being an access area that is not included in the set of available access areas;

determining, based on at least the handover message, a size of an overlap between the detected access area and the access area for which the set of available access areas is maintained;

predicting potential of the detected access area based on at least the handover message received from the at least one mobile device, wherein the predicted potential is determined based on the size of the overlap, wherein as the size increases, the predicted potential of the detected area increases a likelihood that the detected access area is added to the set of available access areas, wherein the predicting of the potential comprises weighting information included in the handover message, and wherein the information included in the handover message comprises a quantity of handover reports; and deciding, based on the predicted potential, whether to include the detected access area in the set of available access areas.

* * * * *